March 3, 1970 L. FEUERSÄNGER 3,498,029
FUEL FEED SYSTEM
Filed Oct. 16, 1967 2 Sheets-Sheet 1
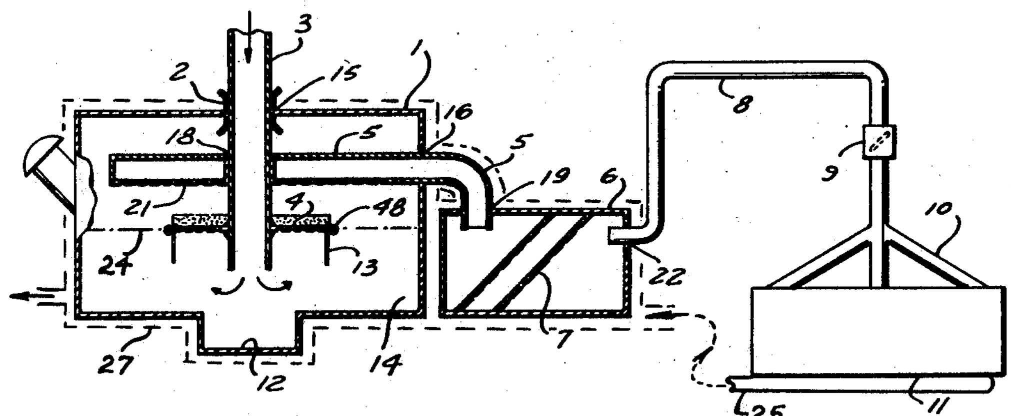
FIG. 1
FIG. 2
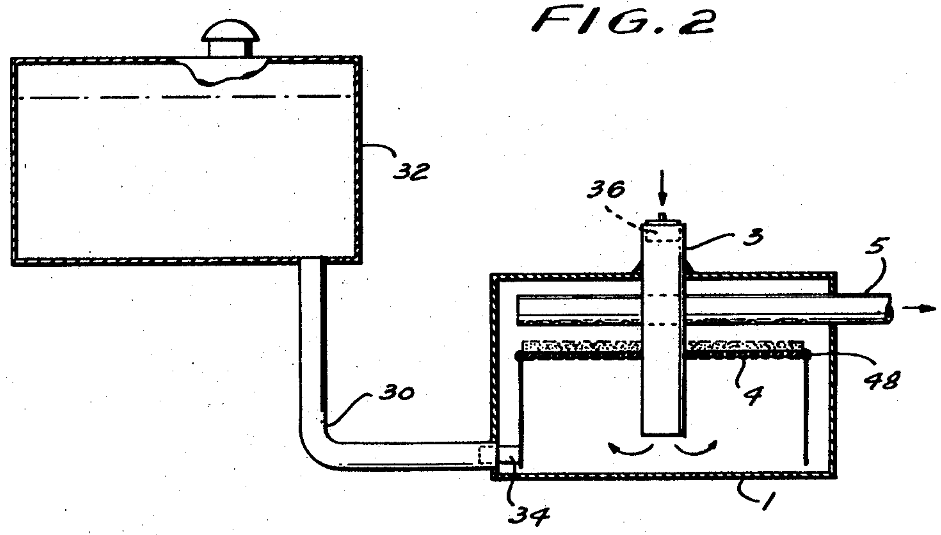
INVENTOR.
LOUIS FEUERSANGER

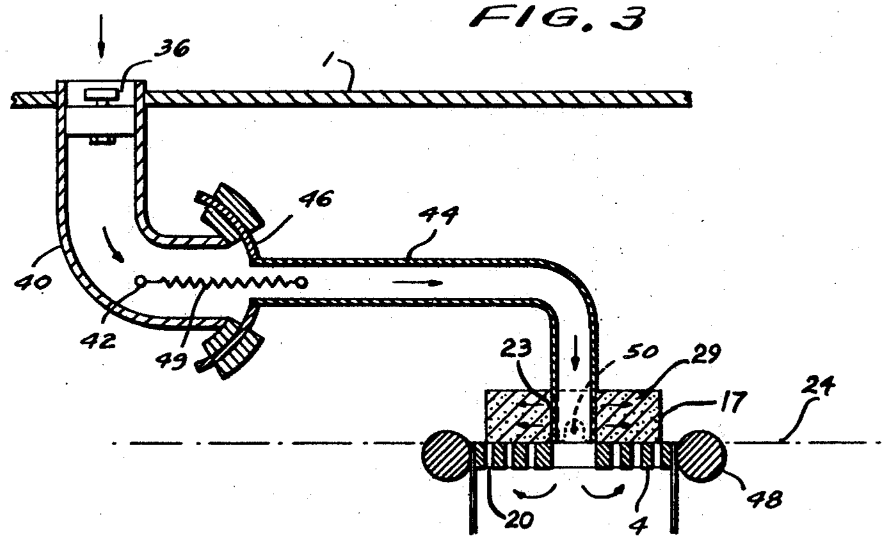
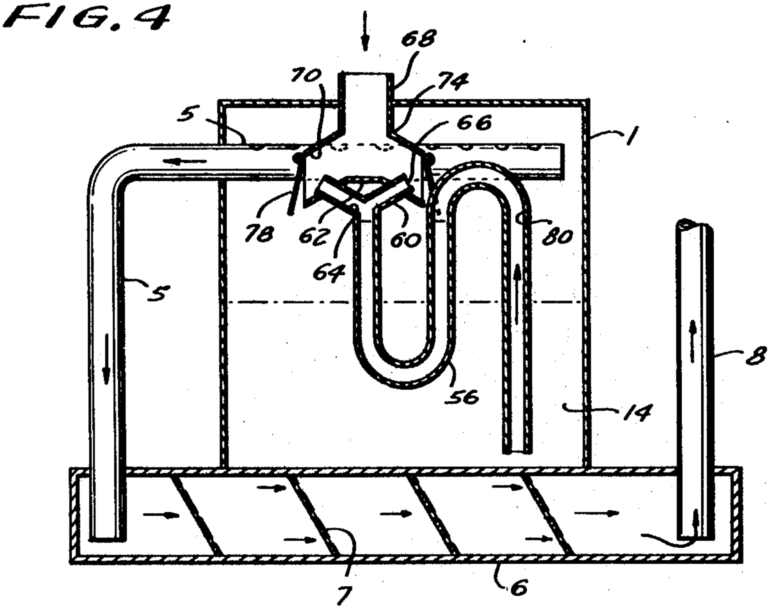
INVENTOR.
LOUIS FEUERSANGER

United States Patent Office 3,498,029
Patented Mar. 3, 1970

1

3,498,029
FUEL FEED SYSTEM

Louis Feuersänger, 59 am Wickrater Tor, 405 Monchen-Gladbach-Rheindahlen, Germany Continuation-in-part of application Ser. No. 508,295, Nov. 17, 1965. This application Oct. 16, 1967, Ser. No. 675,685
Int. Cl. B01d *47/00*
U.S. Cl. 55—257 5 Claims

ABSTRACT OF THE DISCLOSURE

Fuel feed systems for internal combustion engines wherein the engine intake port is connected to an opening above the fuel line in a fuel containing sealed tank. A Y-shaped hollow fitting has a vertical leg inserted into another opening above the original opening in the tank. The two sloping legs of the fitting are disposed in the tank below the vertical leg. Each leg has a manually closed valve opened only by engine suction. A hollow fuel feeding unit has a lower end in the tank below the fuel line and an upper end with two conduits, each of which communicates with the corresponding sloping leg.

CROSS REFERENCE TO RELATED APPLICATION

This application is a continuation in part of my copending application S.N. 508,295 filed Nov. 17, 1965, for Fuel Feed System and now abandoned.

SUMMARY OF THE INVENTION

My fuel feed system is designed for operation with an internal combustion engine which has a discharge through which products of combustion are discharged at a first and elevated temperature range. The engine also has an intake port at which a suction force is exerted to draw therein a fuel-air mixture maintained at a second and lower temperature range.

My system includes a hollow diffusion and expansion stage which is sealed except for oppositely disposed inlet and outlet openings. The outlet opening is coupled to the intake port. The inlet opening receives a non-homogenous mixture of fuel vapor and air which contains entrained drops of liquid fuel and is at a third temperature range higher than the second range and lower than the first range. The mixture is cooled, homogenized and has the drops removed by processes of expansion and diffusion as it is pulled through the stage by the suction force.

A hollow tank is sealed except for first and second openings therein and contains liquid fuel at a level below both openings. The second opening is coupled to the intake opening of the stage whereby the suction force reduces the pressure in the tank below that of the atmosphere and a portion of the fuel vaporizes. As a result, the fuel exhibits liquid and vapor phases separated by an interface.

Air is supplied to the first opening at atmospheric pressure and at a fourth temperature range higher than the third range and lower than the first range. Means in the tank passes this air through the vapor phase and into contact with the interface whereby the non-homogeneous mixture is created and supplied to the second opening.

A manually controlled throttle valve can be interposed between the stage and the engine in the path of flow of the homogeneous mixture to control the rate of mass flow of this mixture to the engine. In other words the ratio of weight vaporized fuel to weight of air is not changed by the action of the valve; only the weight of mixture flowing to the engine per unit time is varied;

As a result, complete combustion of the mixture in the engine ensues; a larger power output put unit of fuel is obtained in the engine; fuel consumption is reduced; and noxious carbon monoxide exhaust fumes are essentially eliminated. My system is far less sensitive to deleterious contamination by water or dirt than conventional systems; it uses fewer and far less complicated parts; it operates more reliably; and it requires much less maintenance.

BRIEF DESCRIPTION OF THE DRAWINGS

In the drawings:

FIG. 1 shows one form of my invention;

FIG. 2 shows a modification thereof;

FIG. 3 shows an additional modification thereof; and

FIG. 4 shows still a further modification thereof.

Referring now to FIG. 1 there is shown a fuel tank 1 partially filled with liquid gasoline 14. Tank 1 is provided with a top orifice or opening 15 and a side orifice or opening 16. A vertical hollow air intake pipe 3 extends through orifice 15 into the tank with the top open end positioned above the tank and the lower end extending into the liquid. Pipe 3 is free to move vertical up or down but is sealed in the orifice by flexible sealing membrane 2. The bottom end of the pipe is secured to float 4. Float 4 has a horizontal circular hoop 13 secured to its bottom surface. Float 4 is in contact with the surface 24 of the gasoline 14.

A horizontally extending suction pipe 5 disposed in the tank above the surface of the gasoline has one end sealed and the other end extending through orifice 16. Orifice 16 is connected to inlet opening 19 of a hollow diffusion and expansion stage 6. Stage 6 has an outlet opening 22 and is otherwise sealed. Stage 6 also is provided with inclined, spaced apart, perforated diffuser or baffle plates 7.

Pipe 5 has sealed therein a vertical hollow sleeve 18 open at both ends through which pipe 3 extends intermediate its ends. Pipe 3 can be disposed directly above a vertical well 12 in tank 1.

Outlet opening 22 is connected via flexible hollow suction tubing 8 to the intake port of manually controlled throttle valve 9. The outlet of valve 9 is connected by distribution manifold 10 to an internal combustion gas fueled engine 11. The products of combustion are discharged from the engine at a first and elevated temperature range at 25.

As the engine runs, a suction, typically lower than twenty inches of mercury, when idling is created sequqentially by each of the cylinders which lowers the pressure in the tank below atmospheric and causes an additional portion of the liquid fuel to vaporize and increase the concentration of fuel in the vapor phase, with a vapor-liquid interface at or above 24. The suction causes air from the surrounding ambient which is at a fourth temperature range below the first range to be drawn through the vapor by means of perforation 23 and pores 29 in disc 17. Some air passes downward through bottom open end of pipe 3 into the liquid and then pulled through the float 4 into the vapor phase. As a result, the air leaving the liquid phase now carries entrained fine drops of liquid fuel. All of the air now passes through perforations 21 into the suction pipe, and in this process a non-homogeneous mixture of fuel vapor and air with the entrained drops. The air loses heat in this process and the non-homogeneous mixture is at a third temperature range below the fourth range. As this mixture flows through stage 6, it is permitted to expand and diffuse and consequently cool to a second range below the third range (the liquid drops are removed by the plates 7) and becomes homogeneous. The mixture thus contains no liquid gasoline whatsoever and can be fully burned or consumed (complete combustion) in the engine with resultant increased efficiency. When the power consumption of the engine is to be varied, it is only necessary to vary the setting of the valve manually by hand or foot control to vary the rate of mass flow of the mixture. Note that the ratio of air to vaporized fuel in the mixture is not affected by varying the setting of the valve.

However, the engine cannot function efficiently unless the homogeneous mixture is within a suitable temperature range, such as 65–80° F. Due to the diffusion and expansion which takes place in stage 6 without air or fuel and necessarily produces a cooling action, the mixture entering the stage must be at a higher temperature range such as 75–90° F. Finally, since the air entering the tank will necessarily be cooled as it is mixed with the fuel in the tank and, therefore, must be at a still higher temperature range such as 80° to 120° F. Ambient air is normally not this hot; in this situation the air should be heated either just before entering the tank or while in the tank. One method as in phantom in FIG. 1 is to pass the hot exhaust gas (products of combustion) via a feedline into and out of a hollow jacket 27 about the tank. The jacket thus acts as a heat exchanger.

In the arrangement of FIG. 2, the pipe 3 is held rigidly in place, but the float 4 slidably engages pipe 3 and is free to rise and fall together with changes in the level of the liquid level. Tank 1 has a bottom side opening connected by a fuel supply line 30 to the bottom of a main fuel tank 32, and a member 34 controlled by float 4 moves up and down to vary the size of the opening in line 30 communicating with tank 1 to control the rate of flow of liquid gasoline from tank 32.

Air flows into the top end of pipe 3 in tank 1 through a normally closed air intake valve 36 which is opened only when suction is present. The operation is otherwise the same as set forth above.

FIG. 3 shows a modification of the system described above which functions in the same way but has a slightly different geometry. For simplification of description, the suction pipe means of the preceding FIGURES 1 and 2 is not shown (though it must be used) in FIG. 3.

Mounted in tank 1 is a right angle hollow elbow 40 having its top open and extending through the top of the tank and containing an adjustable air intake valve 36. A transverse horizontal pin 42 is rigidly secured within the interior of the elbow. A hollow member 44 open at both ends has its upper end secured by seal 46 to the vertical opening at the lower end of the elbow 40. A spring loaded counter balance 49 secures member 44 to pin 42 whereby member 44 can be pivoted in a vertical plane about pin 42 and also reduces the effect of the weight on the other end of member 44 as described below.

Member 44 has a main portion extending above the level of the liquid gasoline and terminating in a downwardly extending open end about which float 4 is disposed as before.

Float 48 will pivot up or down about pin 42 depending upon the fuel level.

In FIG. 4, a somewhat different physical structure is used to obtain the gaseous fuel mixture. More particularly, the means for producing the fuel air mixture in gas tanks takes the form of a double U shaped tube 56 having its bottom opening close to the bottom of the tank 1 and terminating at its top end in a flaring horizontal fitting 60 having insert 62 which form two sloping opposed conduit 64 open at the upper ends to form ports 66. An inverted Y shaped fitting 74 has a vertical hollow leg 68 through which air enters the tank 1 and two sloping hollow legs 70, each port 66 communicating with the interior of a corresponding leg 70. Each leg 70 has a discharge port sealed by a normally closed spring loaded valve on gate 78 which is opened whenever suction is supplied to the system. The suction tube means can be a perforated tube 5 as before.

In operation, gates 78 are opened, and air is pulled into the tank by suction. More particularly, the air rushed through legs 70 and, by the well known venturi effect, picks up drops of liquid fuel from the interface as it passes by ports 66. The liquid fuel is pulled up through tube 56 and conduit 64 from the bottom of tank 1 by suction. (During operation, there is a continuous stream of liquid gasoline flowing through tube 56; when the engine stops and suction ceases, a vacuum region 80 forms in a mid-section of the tube 56.)

The fuel drop carrying air as it is collected by the suction means, passes through the fuel vapor and forms the desired mixture. As before, this mixture passes through an expander and diffuser stage on its way to the throttle valve and engine.

If required by government safety regulations a separate safety valve can be installed in either or both of lines 5 and 8. This valve will be normally open, but in the event that the pressure drop in such lines reverses, the valve or valves will close and shut off the system, thus eliminating any possibility of "backflash" of the gaseous mixture. If desired, the engine suction means can be augmented or replaced by a separate compressor.

I claim:

1. A fuel feed system designed for operation with an internal combustion engine having a discharge port through which products of combustion are discharged at a first temperature range, said engine having an intake port at which a suction force is exerted to draw therein a fuel-air mixture maintained at a second and lower temperature range, said system comprising:

a hollow tank sealed except for first and second openings and containing liquid fuel at a level below both openings, said first opening being in the top of the tank, said second opening being in the side of the tank;

means connecting said second opening to said intake port;

an inverted Y shaped hollow fitting having a vertical hollow leg extending through the first opening, said leg being open whereby air can enter said tank, said fitting having two sloping hollow legs extending downward in said tank from the bottom end of the vertical leg, each sloping leg having a discharge port therein;

a pair of normally closed spring loaded valves, each of which is disposed in a corresponding discharge port to open same only when suction is exerted via said second opening; and a hollow tube fuel feeding unit having a lower end disposed below the fuel line and an upper end disposed above the fuel line, said upper end forming two sloping opposed conduits with ports therein, each conduit communicating with the interior of a corresponding one of the sloping legs of said fitting.

2. A system as set forth in claim 1 wherein each sloping leg of said fitting has an opening through which the corresponding conduit extends.

3. A system as set forth in claim 2 wherein said means includes a hollow perforated pipe extending from the interior of said tank above the fuel level out of said second tank opening.

4. A system as set forth in claim 3 wherein said unit intermediate its upper and lower ends takes the form of a double U shaped tube.

5. A system as set forth in claim 4 wherein said means includes a diffusion and expansion stage sealed except for an inlet connected to said pipe and an outlet connected to the intake port.

References Cited

UNITED STATES PATENTS

| | | | |
|---|---|---|---|
| 743,416 | 11/1903 | Anderson | 261—75 |
| 956,048 | 4/1910 | Dawson | 261—124 |
| 988,398 | 4/1911 | Stein | 55—256 |
| 1,093,343 | 4/1914 | McAndrews | 261—75 X |
| 1,213,462 | 1/1917 | Cumming | 261—78 |
| 1,539,589 | 5/1925 | Nattrass | 261—120 |
| 2,981,526 | 4/1961 | Grumbach | 261—121 |

HARRY B. THORNTON, Primary Examiner

U.S. Cl. X.R.

261—78